No. 787,351. PATENTED APR. 18, 1905.
W. H. BROWN.
FRICTION CLUTCH.
APPLICATION FILED NOV. 21, 1902.
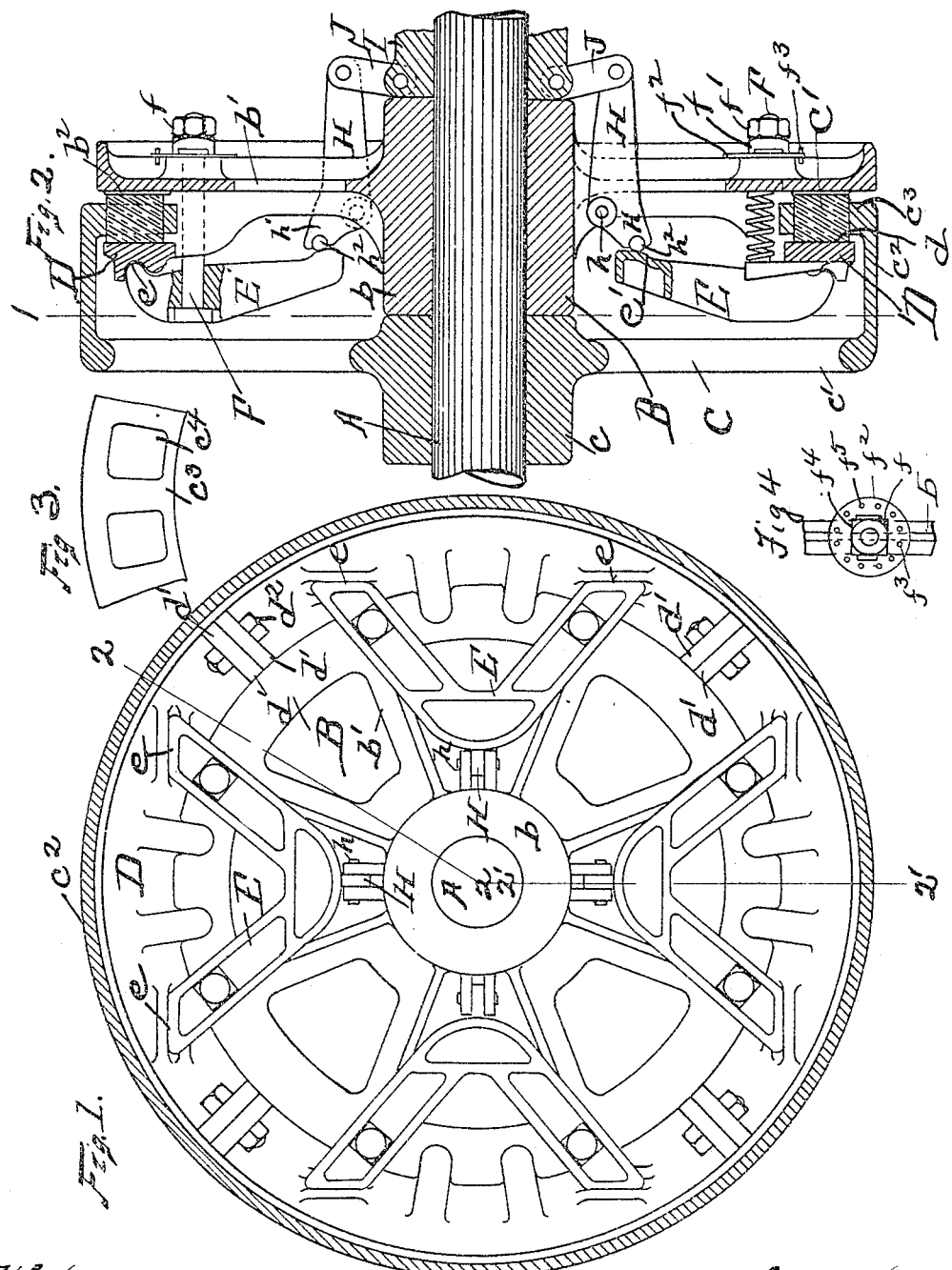

No. 787,351.

Patented April 18, 1905.

UNITED STATES PATENT OFFICE.

WILLIAM H. BROWN, OF ERIE, PENNSYLVANIA.

FRICTION-CLUTCH.

SPECIFICATION forming part of Letters Patent No. 787,351, dated April 18, 1905.

Application filed November 21, 1902. Serial No. 132,221.

*To all whom it may concern:*

Be it known that I, WILLIAM H. BROWN, a citizen of the United States, residing at Erie, in the county of Erie and State of Pennsylvania, have invented certain new and useful Improvements in Friction-Clutches; and I do hereby declare the following to be a full, clear, and exact description of the invention, such as will enable others skilled in the art to which it appertains to make and use the same.

This invention relates to friction-clutches; and it consists in certain improvements in the construction thereof, as will be hereinafter fully described, and pointed out in the claims.

The invention is illustrated in the accompanying drawings, as follows:

Figure 1 shows a section on the line 1 1 in Fig. 2. Fig. 2 shows in its upper part a section on the line 2 2 in Fig. 1 and in the lower part of the figure a section on the line 2' 2' in Fig. 1. Fig. 3 shows a detail of the friction-surface. Fig. 4 is an elevation of the means for locking the adjusting-nut.

A marks the shaft on which the clutch is mounted. This may be driven by the clutch or arranged to drive the clutch, and either part of the clutch may be secured to the shaft by any desirable means. (Not shown.)

B designates one part of the clutch, and for convenience of description this is assumed to be the driving part of the clutch. This has the hub $b$, which is arranged on the shaft, a flange portion $b'$, extending from the hub, and a friction-surface $b^2$ on the outer portion of the flange. The driving part of the clutch C has the hub $c$, journaled on the shaft, the web $c'$, the flange $c^2$, projecting from the web, and the friction-plate $c^3$, extending inwardly from the outer edge of the flange. Arranged within the flange $c^2$ is the friction-ring D, having the friction-surface $d$ thereon. In order to get this friction-ring within the flange, it is made in sections, each section being provided at its end with the projections $d'$. These are screwed together by means of the bolts $d^2$, so that when all the parts are secured together there is a complete ring D. Arranged within the flange are the operating-levers E. They are fulcrumed on the bolts F, which extend from the levers E to the flange $b'$. These bolts are provided with the adjusting-nut $f$, by means of which the clutch may be adjusted. Jam-nuts $f'$ are provided, and as an additional protection against the loosening of the nut I provide the plate $f^2$. This is provided with a hole $f^4$, which fits the nut and locks it with it, and a series of holes $f^5$, into which is placed the pin $f^3$, which contacting a part of the flange $b'$ prevents the turning of the nut. The outer ends of the levers act upon the ring D. The inner ends of the levers are operated by the bell-crank levers H. The levers have the cam-surface $e'$ to effect a larger movement for release, the surface being shaped to give maximum power at the end of the movement of the bell-crank. The bell-cranks H are pivoted at $h$ and have the arms $h'$, on which there is a bearing $h^2$. The outer ends of the bell-crank levers H are connected, by means of the links J, with the sliding collar I. It will readily be seen that as the collar I is moved inwardly the links J are brought more nearly perpendicular to a line extending from the outer end of the lever H to its pivot, so that the arms $h'$ are rocked, thus operating the levers E. The sliding block I is permitted to go slightly past the perpendicular position mentioned to the position shown in Fig. 2, so as to set the clutch in position.

It will be noted that the friction-plate $c^3$ has perforations $c^4$. The friction-blocks C', preferably of wood, are arranged in these perforations, and it will be noted that both surfaces of these blocks of wood are engaged by the clutch mechanism. The levers E are V-shaped, the two arms of the lever extending some distance apart, so that the ends $e$ of the lever, operating upon the ring D, extend over quite a portion of the surface of the ring. In this way the ring gets a support from its inner to its outer edge, and this prevents springing it out of shape. The V-shaped levers also support the ring D at a greater number of points than would single levers. At the same time it forms a very light construction and reduces the number of levers H. It will also be noted that the levers E are entirely housed and closed within the flange $c^2$. Thus the principal working parts of the clutch are protected.

What I claim as new is—

1. In a friction-clutch the combination of the driven and driving members of the clutch, one of which has a projecting flange with the friction-surfaces thereon, and the other member having a friction-surface at the outside of the friction-surface of the flange; a friction-ring arranged within the flange and to operate upon the inside of the friction-surface of the flange; clutch-operating levers arranged within the flange in position to operate upon said ring; fulcrum-bolts extending intermediately of the ends of said levers to the member without the flange; and bell-crank levers arranged to operate upon said operating-levers.

2. In a friction-clutch the combination of a clutch-flange; a friction-ring arranged to operate upon the flange; a V-shaped lever having the ends of the arm arranged to operate upon said friction-ring; and means for operating said lever.

3. In a friction-clutch the combination of the friction-flange $c^3$; ring D arranged to operate on said flange; the V-shaped lever E having the arms arranged to operate upon the ring D; and a single lever mechanism at the apex of the V-shaped lever for operating both arms of the lever.

4. In a friction-clutch the combination of the member B, having the hub $b$, flange $b'$, and the friction-surface $b^2$; the member C having the hub $c$, web $c'$, projecting flange $c^2$, and inwardly-extending perforated friction-plate $c^3$; the friction-blocks C', arranged in said perforations; the section-ring D, arranged within the flange in position to operate upon said blocks C'; V-shaped levers E, having their outer arms arranged to operate upon the ring D; the fulcrum-bolts F; adjusting-nuts of said bolts F; and bell-crank levers arranged to operate upon the inner ends of the V-shaped levers.

In testimony whereof I affix my signature in presence of two witnesses.

WILLIAM H. BROWN.

Witnesses:
 JUSTIN P. SLOCUM,
 GRACE E. YARD.